Oct. 9, 1923.
R. A. LIGHT ET AL
1,470,537
METHOD OF MAKING METALLIC RINGS AND PACKING RING BLANK
Filed Dec. 22, 1922
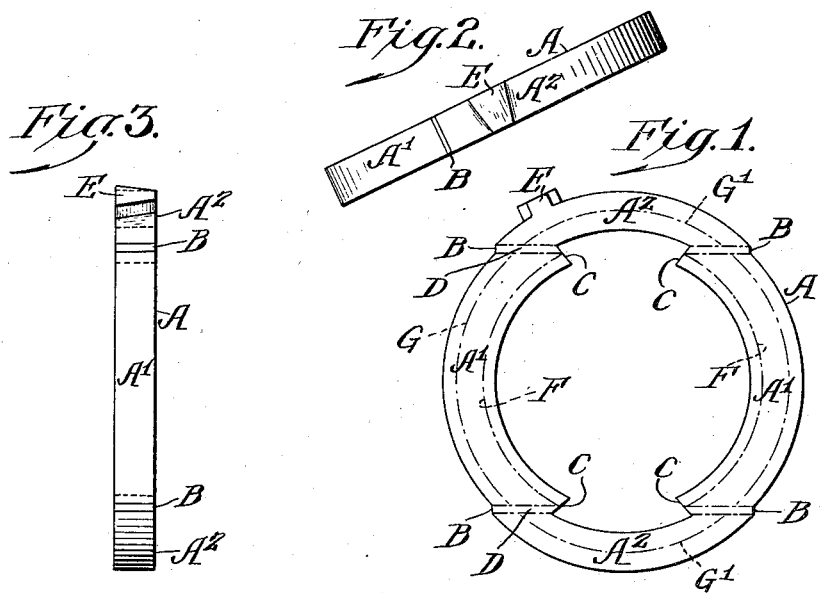
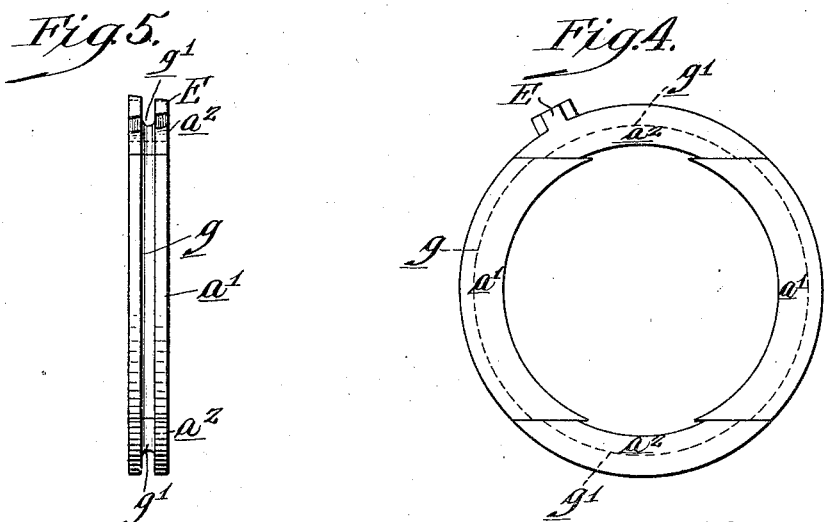
Inventors.
Ralph A. Light,
and Joseph W. Price Jr.
by Francis D. Chambers
their Attorney.

Patented Oct. 9, 1923.

1,470,537

UNITED STATES PATENT OFFICE.

RALPH A. LIGHT AND JOSEPH W. PRICE, JR., OF PHILADELPHIA, PENNSYLVANIA, ASSIGNORS TO THE UNITED STATES METALLIC PACKING COMPANY, OF PHILADELPHIA, PENNSYLVANIA, A CORPORATION OF PENNSYLVANIA.

METHOD OF MAKING METALLIC RINGS AND PACKING-RING BLANK.

Application filed December 22, 1922. Serial No. 608,462.

*To all whom it may concern:*

Be it known that we, RALPH A. LIGHT and JOSEPH W. PRICE, Jr., citizens of the United States of America, and residents of Philadelphia, in the county of Philadelphia, in the State of Pennsylvania, have invented certain new and useful Improvements in Methods of Making Metallic Rings and Packing-Ring Blank, of which the following is a true and exact description, reference being had to the accompanying drawings, which form a part thereof.

Our invention relates to metallic rings of the type in which the individual rings are made up of two packing sections properly spaced from each other by guide sections and on which the packing sections are free to move in and out.

The object of our invention is to provide an improved method of making such packing rings and an improved cast blank from which, by our new method, the packing rings are formed.

The nature of our improvements will be best understood as described in connection with the drawings in which they are illustrated and in which—

Figure 1 is a side elevation of the cast blank from which our packing ring is to be made, showing in dotted lines the cuts which divide the blank into packing and guide sectors and the other cuts which are to be made in the blank or in parts thereof in the operation of forming a complete ring.

Figure 2 is an end elevation of the ring shown in Fig. 1, and

Figure 3, another end elevation taken at a different angle.

Figure 4 is a side elevation of the completed ring, and

Figure 5 an end elevation of the completed ring.

The first step of our improved process consists in forming a cast blank A of proper material having two oppositely disposed annular sectors A', A', adapted to be formed into the packing sections of the ring and two oppositely disposed sectors $A^2$, $A^2$, adapted to be formed into the guide lock sectors of the ring. The sectors A' are of smaller diameter than the sectors $A^2$ and in the cast blank the sectors are formed with internal angular walls C, C, etc., connecting the sectors A' and $A^2$ and external angular walls B, B, etc., connecting the outer surfaces of the two sectors. One of the sectors $A^2$ is formed with a radially extending lug E having an angular outline in cross section, as shown. The sectors are divided from each other by parallel saw cuts made through the walls B and C. As indicated at D, and preferably, before dividing the cast blank in this way a groove indicated in dotted lines at G in Fig. 1 is turned in the outer surface of the blank so that when the saw cuts D divide the blank into packing and guide sectors and the parts are assembled together, as shown in Fig. 4, the groove $g$ in the packing sectors a', a', will lie further from the center of the ring than is the case with the groove $g'$ in the guide sectors $a^2$, $a^2$.

To fit the ring for use in connection with the piston rod of an engine the inner faces of the packing sectors A' should be turned down, as indicated in dotted lines at F, Fig. 1. This may be partly done with the blank before it is severed into sections but is usually completed in the shop in preparing the ring for use in connection with the piston rod.

The grooves $g$ and $g'$ are intended for the reception of a garter spring which holds the ring sections together and presses them upon the rod and the construction resulting is, we believe, new with us and forms the subject matter of our co-pending application.

Having now described our invention, what we claim as new and desire to secure by Letters Patent, is:

1. The method of making metallic packing rings which consists in casting a ring with two opposite annular sectors adapted to be formed into the packing block sections of a packing ring and with two opposite annular sectors of greater diameter and each adapted to be formed into the guide block section of a packing ring, and dividing said ring into packing and guide sections by parallel saw cuts.

2. The method of making metallic packing rings which consists in casting a ring with two opposite annular sectors adapted to be formed into the packing block sections of a packing ring and with two opposite annular sectors of greater diameter and each adapted to be formed into the guide block sections of a packing ring cutting a circumferential circular groove in the outer face of said ring.

3. A metallic packing ring blank cast with two opposite sectors adapted to be formed into the packing block section of a packing ring and two opposite sectors of greater diameter adapted to be formed into the guide block sections of a ring, said sectors being so disposed relatively to each other that the ring will be divided into packing and guide block sections by two parallel saw cuts.

RALPH A. LIGHT.
JOS. W. PRICE, Jr.